United States Patent

Desilets et al.

[15] 3,662,688
[45] May 16, 1972

[54] CODER FOR INDUSTRIAL CONVEYORS

[72] Inventors: Dennis W. Desilets, Sterling Heights; Michael E. Cleaver, Farmington, both of Mich.

[73] Assignee: Standard Alliance Industries, Inc., Chicago, Ill.

[22] Filed: Jan. 28, 1970

[21] Appl. No.: 6,505

[52] U.S. Cl. ............................ 104/88, 104/172, 104/130, 104/96
[51] Int. Cl. .............................. B65g 43/08, B65g 17/42
[58] Field of Search ............... 104/88, 172; 198/38; 214/11

[56] References Cited

UNITED STATES PATENTS

| | | | |
|---|---|---|---|
| 2,751,091 | 6/1956 | Freeman | 104/88 |
| 3,156,193 | 11/1964 | Anderson | 104/88 |
| 3,200,767 | 8/1965 | Klamp | 104/88 |
| 3,351,176 | 11/1967 | Boissevain | 104/88 |

FOREIGN PATENTS OR APPLICATIONS

| 791,276 | 2/1958 | Great Britain | 198/38 |
|---|---|---|---|

*Primary Examiner*—Arthur L. La Point
*Assistant Examiner*—D. W. Keen
*Attorney*—Harness, Dickey & Pierce

[57] ABSTRACT

A coder for industrial conveyors comprising pivoted indicator and switch actuating means mounted on and movable with the work carriers, and an actuator means adapted to be mounted beside the track which supports the work carriers and in the path of travel of the indicator means and operative as the work carriers move thereby to move the indicator means either to or from the switch actuating position.

4 Claims, 9 Drawing Figures

INVENTORS
Dennis W. Desilets,
Michael E. Cleaver
BY Harness, Dickey & Pierce
ATTORNEYS

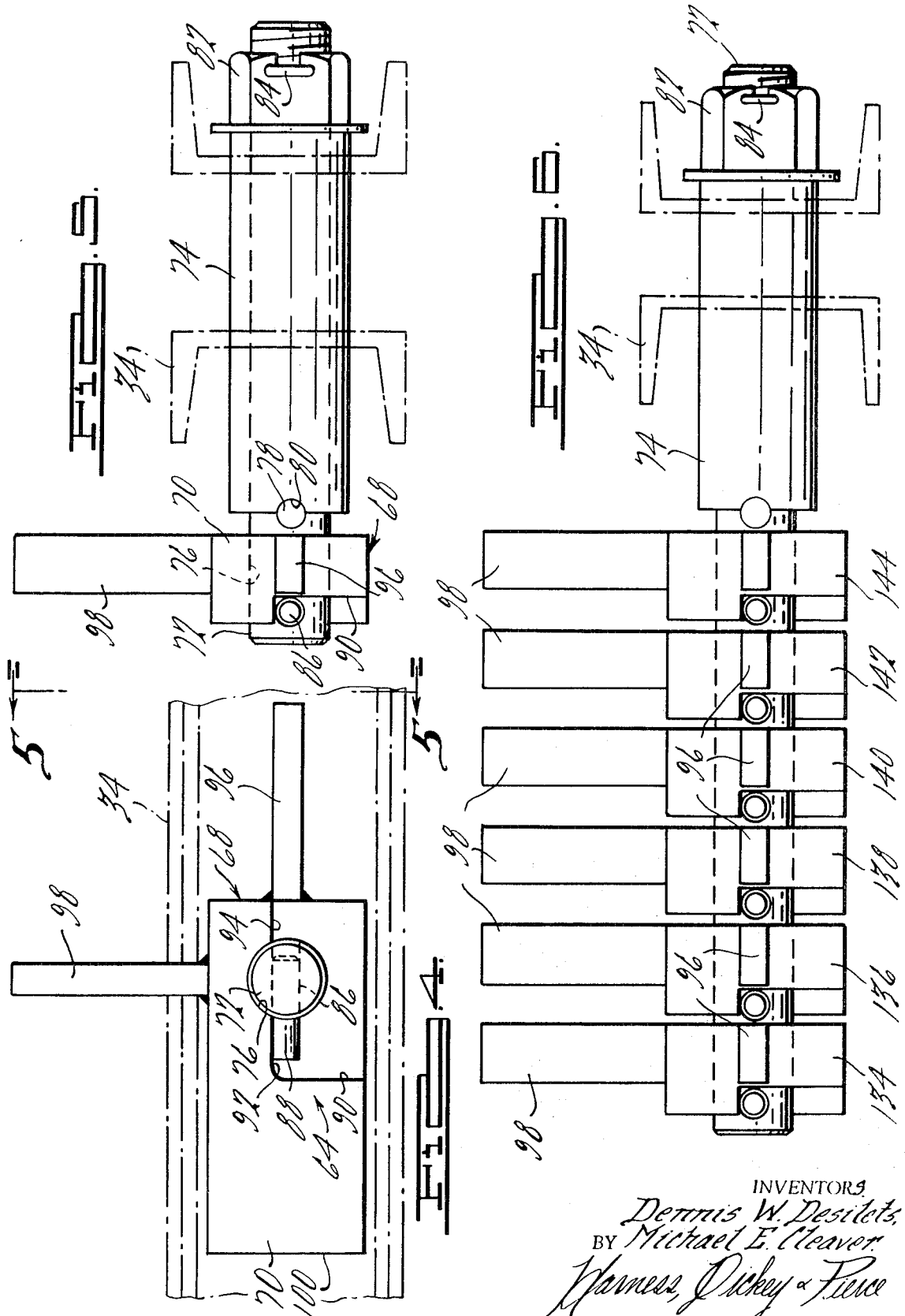

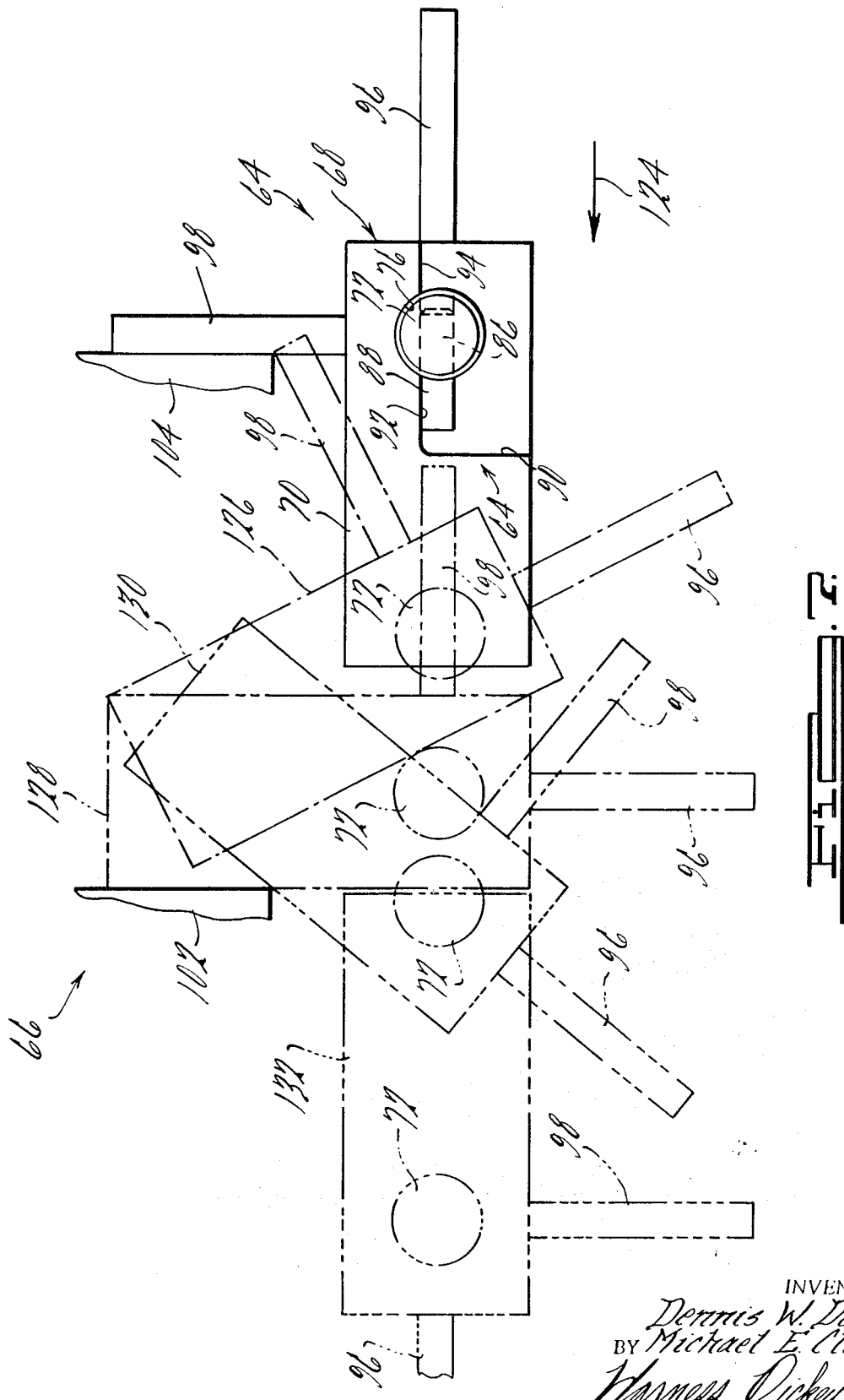

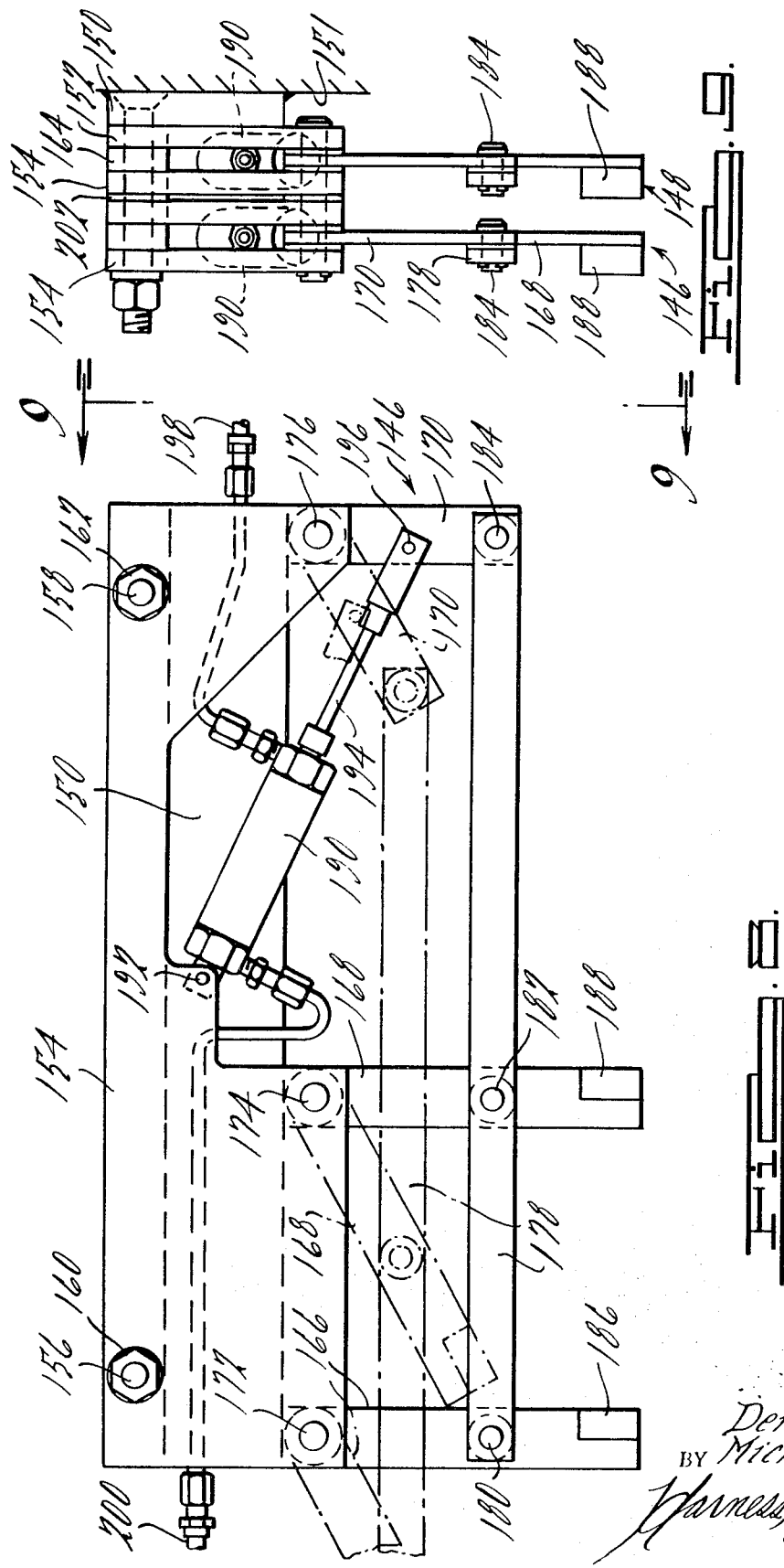

CODER FOR INDUSTRIAL CONVEYORS

BACKGROUND OF THE INVENTION

Industrial conveyors have been conventionally equipped with various kinds of coders for directing the course of movement of the work carriers in the system. Coders usually are mechanical or electrical devices on the work carriers that cooperate in some manner with switch operating mechanisms so as to direct the carrier to go one way or another at a switch depending on the preset condition of the coder. Although the coder is adaptable to any kind of industrial conveyor, it is primarily adapted and pre-eminently suited for power and free conveyors. As a typical example of a simple coding operation in a conveyor of the latter type, an operator may examine a workpiece at an inspection station and preset a coder on the carrier from which the work is suspended according to whether the workpiece passes inspection or not. If the workpiece passes inspection, the coder is positioned to direct the carrier along the main path of travel through the conveyor system and perhaps to a subsequent processing, machining or assembly operation. On the other hand, if the workpiece fails to pass inspection, the coder is set to operate a switch, usually as the carrier leaves the inspection station, so as to direct the carrier onto a side or spur track where the workpiece is either discarded or reprocessed. More complicated coding sometimes is necessary, however, particularly in complex conveyor systems. In these situations, it may be necessary to guide the carrier through a complex series of switches depending upon the nature of the workpiece and the exigencies of the particular situation. A typical more complex coding requirement might arise for example where the conveyor system serves and draws from a material storage and retrieval area of the type shown in the Hegelman application Ser. No. 714,495, filed Mar. 20, 1968. In a conveyor system of this type it may be necessary or desirable at a loading dock where workpieces are placed on the carriers to code each carrier to deliver the workpiece carried thereby to a particular one of a large number of storage compartments; and in any particular situation, the route followed by the carrier may be quite intricate and elaborate involving movement thereof through a large number of switches.

As suggested, many types of coding equipment have been devised, but the problem is to develop a coder that is relatively simple and inexpensive to install and that is rugged and durable in use so as to require little if any servicing or maintenance. Industrial conveyor systems of the type here under consideration are subject to a great deal of rough handling and abuse. In the case of power and free conveyors, the work carriers frequently travel high overhead where they are not readily accessible and they usually operate in a dusty, dirty environment which frequently subjects the carriers also to various kinds of dirt and grime.

SUMMARY OF THE INVENTION

According to the present invention, one or more indicator means are mounted on a pivot attached to the work carrier. The indicators are independently pivotally movable on the pivot shaft through an angle of approximately 180° and are moved from one position to another by actuators preferably mounted on the track along which the carrier travels. Each indicator has a plurality of radial fingers which engage and cooperate with its respective actuator to rotate the indicator, and one of the fingers is relatively large and heavy so that it serves as a counterweight which holds the indicator normally in one position or the other. Also, one of the fingers serves as a switch operating member when the indicator is in the switch actuating position. Thus, by placing actuators below the indicators, for example, at the beginning of the conveyor system all of the indicators can be preset automatically to a nonswitching operating position; and by placing other actuators above the indicators at strategically located points along the conveyor system, selected ones of the indicators can be moved automatically to switch operating positions. Since the indicators are mounted side-by-side and are independently operable, the number of switch operating possibilities increases in a binary progression directly related to the number of indicators. For example, a work carrier equipped with six indicators has 64 different switch operating possibilities depending on the different combinations and permutations of the indicator settings. Furthermore, since each indicator is individually, positively and mechanically operated, there is little if any chance that actuation of the indicators will be effected adversely by the environment to which the carrier is exposed during its travel through the system. Also, the indicators are simple, mechanically operated parts that are exceedingly rugged and sturdy in construction and reliable in operation and use, and they are capable of performing for long periods of time without servicing or replacement even though the carriers on which they are mounted are subject to a great deal of normally rough handling and abuse.

DESCRIPTION OF THE DRAWINGS

FIG. 4 is an enlarged, fragmentary view of the indicator portion of the coder looking in the direction of the arrow 4 in FIG. 2 the indicator being shown in full lines and the mounting portion of the work carrier being shown in broken lines;

FIG. 5 is a transverse sectional view taken on the line 5—5 of FIG. 4.

FIG. 6 is a view similar to FIG. 5 but showing a modified form of coder indicator means equipped with a plurality of indicating members;

FIG. 7 is an enlarged view similar to FIG. 4 showing by progressive views how any individual indicator is moved from one position to another by an actuator normally mounted alongside the work carrier and in the path of travel of the indicator;

FIG. 8 is a side elevation view showing a modified form of actuator means embodying the invention; and FIG. 9 is a transverse sectional view taken on the line 9—9 of FIG. 8.

DESCRIPTION OF THE PREFERRED EMBODIMENT

Figure 1:
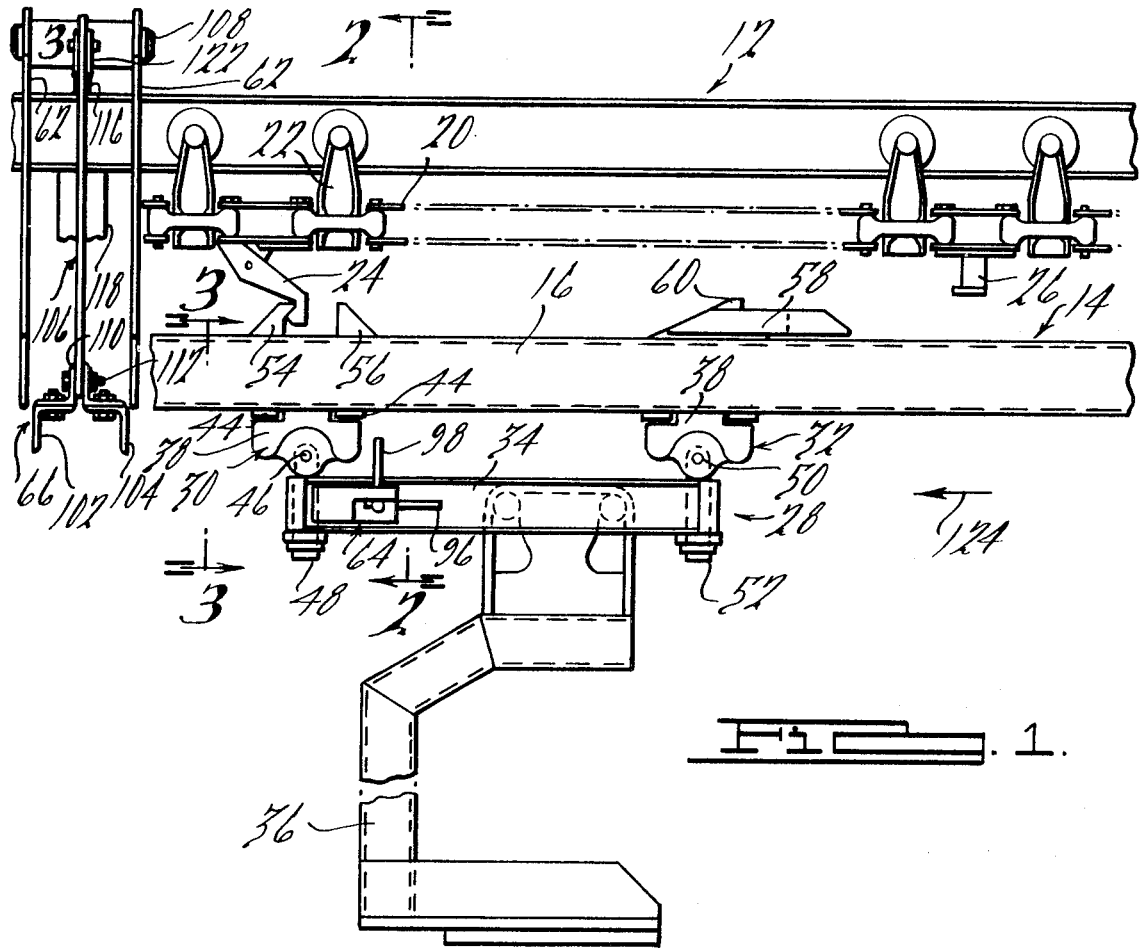
FIG. 1 is a side elevational view showing a typical power and free conveyor system equipped with a coder apparatus having a single indicating member embodying the present invention.

Reference is first had to FIG. 1 which shows a typical power and free conveyor system equipped with a coder embodying the present invention. In its basic construction and operation, the conveyor system here shown is similar to the one disclosed in the Czarnecki application Ser. No. 854,817 which was filed Sept. 3, 1969; and the disclosure of that application is herewith incorporated by reference in this application. Specifically, the conveyor system comprises an upper chain track 12 here shown in the form of an I-beam and a lower carrier track 14 here shown in the form of laterally spaced confronting channels 16 and 18. A power chain 20 suspended from the track 12 by wheeled carriers 22 of a conventional type is provided at spaced intervals along the length thereof with pivoted drag links 24 and fixed pusher members 26 arranged alternately with respect to each other. Work carriers 28 are movable along the lower track 14; and each of the carriers here shown comprises a front trolley 30 and a rear trolley 32 interconnected by a bar 34 from which a work carrying platform 36 is suspended. Each of the trolleys 30 and 32 comprises an upright body 38 disposed between the channels 16 and 18 and provided at opposite sides thereof with front and rear wheels 40 and 42 mounted on stub axles (not shown) on and extending laterally from the body. As suggested, the two wheels on each side of the body 38 are spaced longitudinally apart and all four wheels travel on the lower flanges of the channels 16 and 18, as perhaps best shown in FIG. 3. Horizontal front and rear rollers 44 also carried by the body 38 between the edges of the lower channel flanges guide the trolley as it moves along the track 14 and maintains the body 38 centered substantially midway between the channels 16 and 18. The front trolley coupling is attached to the trolley 30 by a horizontal pivot 46 and to the beam 34 by a vertical pivot 48. Similarly, the rear trolley coupling is attached to the trolley 32 by a horizontal pivot 50 and to the bar 34 by a vertical pivot 52. The horizontal pivots 46 and 50 permit the work carrier 28 to adapt to vertical bends or changes in direction of the track 14, and the vertical pivots 48 and 52 permit the carrier 28 to adapt to horizontal bends and changes in direction of the track 14. Pivoted flop dogs 54 and 56 on the front trolley 30 are engageable by any of the drag links 24, as shown in FIG. 1, to couple the power chain 20 to work carrier 28 so that the latter is dragged along the track 14 at whatever speed the chain travels. In the particular form of work carrier 28 here shown, the rear trolley 32 is equipped with a cam plate 58 having an upstanding abutment 60 which is engageable by the following fixed pusher member 26 upon disengagement of the front trolley 30 by the drag link 24 to which it is coupled. Disengagement of the front trolley 30 from the power chain 20 can occur in various ways and under various circumstances as, for example, at a switch point between one conveyor system and another. In this situation, the front trolley 30 passes through a switch on to a short length of track similar to the one shown at 14 which interconnects the two conveyors; and, as the front trolley moves through the switch, the drag link 24 wipes laterally off of the front flop dog 54 and disengages the work carrier from the power drive. However, as soon as the fixed pusher member 26 engages the abutment 60 it picks up the work carrier from behind and pushes the front trolley on through the connecting track section, through a second switch and onto the trolley track of the second conveyor where it is picked up by another drag link similar to the one shown at 24. The cam plate 58 is adapted also to cooperate with the drag link 24 of a following work carrier on occasions as described in the pending application hereinabove referred to, to permit close-packing of the carriers. Hangers 62 of inverted U-shape provided at suitably spaced intervals along the tracks 12 and 14 are welded to the tracks and hold the latter suitably spaced apart; and the hangers in turn are attached in any suitable or conventional manner to the super structure or other supporting part of the building in which the conveyor is mounted.

The coding apparatus of this invention comprises an indicator 64 which is mounted at some suitable location on the work carrier 28 and an indicator actuator 66 which is mounted alongside the track 14 and in the path of travel of the indicator, as shown in FIG. 1. In the particular form of work carrier here shown, the indicator 64 is mounted on the connecting bar 34 of the carrier and the actuator 66 is mounted between a pair of hangers 62 which are disposed relatively close together, as shown in the drawing. In most instances, it is convenient to mount the indicator 64 as shown on the work carrier 28; however, it will be apparent also that it may be mounted at various locations on the work carrier and that the particular location may well vary from one conveyor installation to another depending on the exigencies of the particular situation. Similarly, it usually is most convenient to mount the actuator 66 somewhere on the track structure of the conveyor, as for example on the hangers 62 in the manner shown; but it will be appreciated that the actuator can be mounted in any suitable manner and in any suitable location anywhere on the track structure or perhaps on some adjacent support which is completely independent of the track or even of the conveyor system.

FIGS. 1–5 show an indicator 64 in its simplest form which comprises a single indicating member 68. The indicating member 68 comprises an elongate generally rectangular bar 70 of metal or the like which is relatively heavy and which serves a double function of assisting in turning the member from one position to another and also a counterweight function in maintaining the indicator in either one or the other of these positions. The bar 70 is loosely mounted on and freely rotatable within limits relative to a pivot 72 which is disposed in and carried by a tubular member 74 extending transversely through and welded or otherwise suitably fastened to the bar 34. It is significant that the hole 76 in the counterweight bar 70 which receives and accommodates the pivot 72 is disposed adjacent one end of the bar so that most of the bar extends to one side of the pivot. A pin 78 extending transversely through the pivot 72 behind and spaced from the bar 70 has projecting end portions which seat in recesses 80 provided at the adjacent end of the tubular member 74; and a nut 82 on the other end of the pivot 72 is tightened against the opposite end of the tubular member 74 to hold the pin 78 seated solidly in the recess 80. A cotter pin 84 holds the nut 82 tight on the pivot shaft. A second pin 86 pressed into a socket provided in the pivot shaft 72 at the outer side of the bar 70 has a projecting end portion 88 which extends into a generally rectangular recess 90 provided in the outer side of the bar 70, as shown in FIG. 5. The projecting end portion 88 of the pin 86 seats against the longitudinal side 92 of the recess 90 at one side of the pivot shaft 72, as shown in FIG. 4, to hold the bar 70 in one position; and, when the bar is pivoted counterclockwise 180° from the position shown in FIG. 4, the projecting end portion 88 of the pin 86 seats against the longitudinal side of the recess at 94 at the other side of the pivot shaft 72 to hold the bar 70 in a second position. Thus, the bar 70 is freely pivotable on the shaft 72 through an angle of ½°, and the pin 86 confines the pivotal movement of the bar to that extent of angular movement. Also, the off center position of the pivot shaft 72 with respect to the bar 70 and the off-set weight of the latter effectively holds the bar in either one or the other of the two positions described above. Welded or otherwise attached to the pivoted end of the bar 70 is a longitudinal finger 96 which extends laterally of the pivot shaft 72 in one direction substantially as far as the bar 70 extends in the other. Similarly, a second finger 98 is welded or otherwise attached to the bar 70 at one side thereof and in alignment with the pivot shaft 72; and the finger 98 preferably extends substantially the same distance from the pivot shaft 72 as the finger 96. Thus, the remote or swinging end 100 of the bar 70 and the ends of the two fingers 96 and 98 are all disposed substantially equidistantly from the turning or pivotal axis of the bar.

Figures 2, 3:
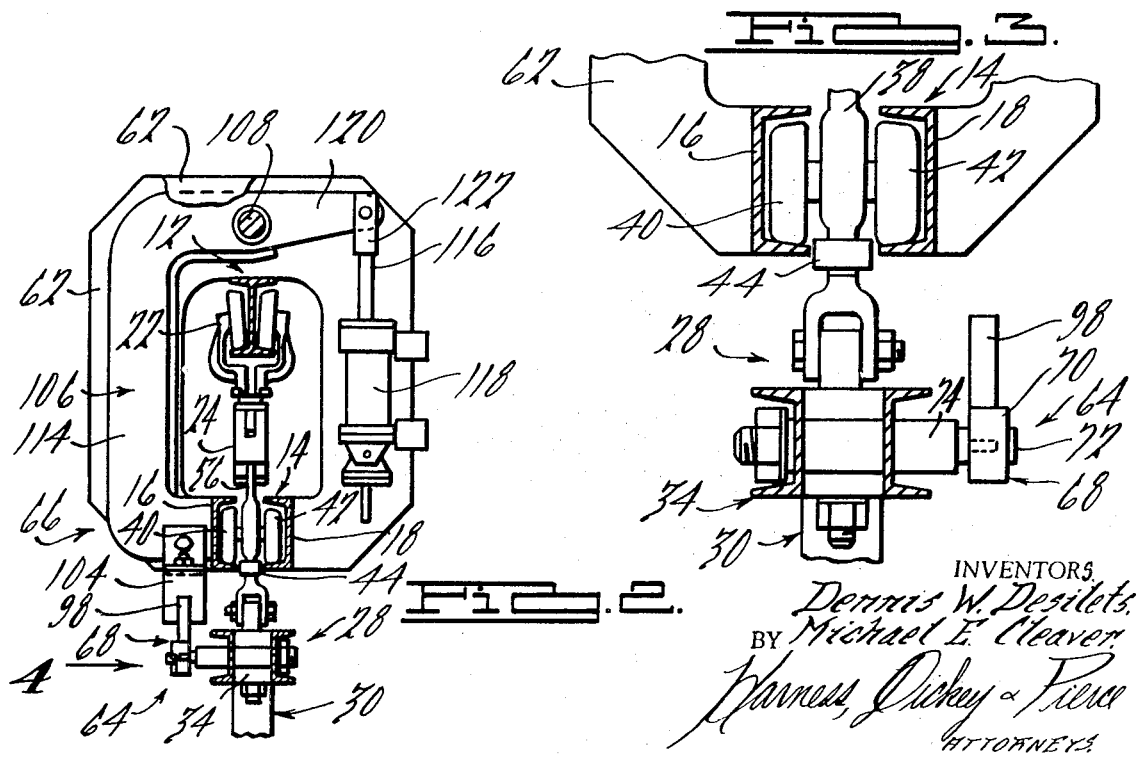
FIG. 2 is a vertical sectional view taken on the line 2—2 of FIG. 1.
FIG. 3 is an enlarged, vertical sectional view taken on the line 3—3 of FIG. 1.

The actuator 66 comprises a pair of longitudinally spaced depending tabs 102 and 104 disposed at one side of the lower track 14 and in the path of travel of the indicator member 68. Under certain circumstances, these tabs 102 and 104 can be stationary; and, in this event, they may conventionally be fastened fixedly to some suitable stationary supporting member as for example one of the hangers 62. Under other circumstances, however, it is desirable that the tabs 102 and 104 be movable into and out of the path of travel of the indicator 68. This latter arrangement is here shown. To this end the two tabs 102 and 104 are attached to one end of a bellcrank level 106 which is pivoted at 108 between two closely spaced hangers 62, as shown in FIGS. 1 and 2. The particular tabs shown are in the form of angle iron members fastened to and dependent from L-shaped brackets 110 and 112 which in turn are fastened to the depending arm 114 of the bellcrank 106. The piston rod 116 of a power cylinder 118 mounted on the side of the hanger 62 opposite the bellcrank 114 is connected to the end of the horizontal bellcrank arm 120 by a clevis 122.

When the piston rod 116 is extended as shown in FIG. 2, the lower end of the bellcrank arm 114 is seated solidly against the lower track channel member 16 to position the tabs 102 and 104 directly in the path of travel of the indicator member 68, as perhaps best shown in FIG. 2; and when the piston rod 116 is retracted, the bellcrank 106 is pivoted clockwise as viewed in FIG. 2 to swing the tabs 102 and 104 laterally away from the lower track 14 and out of the path of travel of the indicator member 68. In practice, the power cylinder 118 is served by a conventional valve (not shown) which directs air or hydraulic liquid as the case may be into one end or the other of the cylinder whereby to advance or retract the piston rod 116, and the valve in turn is controlled by a switch (not shown) according to conventional practice which may be operated either mechanically or manually.

If it is assumed that the piston rod 116 is extended to position the tabs 102 and 104 in operative association with the indicator member 68, the tabs will cooperate with an indicator member when it is positioned as shown in FIG. 1 to turn the latter 180° as shown by progressive views in FIG. 7. Thus, if the indicator 68 is in a switch-operating position when it is disposed as shown in FIG. 1, the tabs 102 and 104 will turn it 180° to a non switch-operating position; viz, to a position in which it will not operate a switch. Thus, if the work carrier 28 is moving in the direction of the arrow 124, the upstanding finger 98 will engage the first tab 104, as shown by the full line position in FIG. 7, as the carrier moves alongside the actuator 66. This will rotate or turn the indicator 68 to the first broken line position 126 shown in FIG. 7; and, as the indicator moves to this position, the counterweight portion of the bar 70 swings clockwise upwardly between the two tabs 104 and 102 to a position where continued movement of the work carrier 28 in the direction of the arrow 124 causes the bar 70 to engage the second tab 102 as shown by the second broken line position 128 in FIG. 7. When this occurs, the second tab 102 pushes against the bar 70 and swings the indicator 68 farther in a clockwise direction, as shown by the third broken line position 130 in FIG. 7. Manifestly, as soon as the counterweight portion of the bar 70 swings past center with respect to the pivot 72 it drops to the last broken line position 132 shown in FIG. 7.

In the normal operation of the equipment, the laterally extending finger 98 of the indicator 68 is adapted to operate a switch (not shown) disposed at any suitable location along the length of the conveyor, and it can operate a switch to provide an electrical signal for any desired purpose, as for example to control the travel of the work carrier 28 in the conveyor system.

In connection with the foregoing, however, it will be apparent that either of the two positions of the indicator 68 may be the switch-operating position. Thus, if the switch is disposed above the indicator 68 the finger 98 will operate the switch when it is in the upstanding position shown in FIG. 1 and if the switch is disposed below the indicator 68 the finger 98 will operate the switch when the indicator is in the position shown at 132 in FIG. 7. Similarly, the actuator 66 can be positioned above the indicator 68 to move the indicator from the full line position in FIG. 7 to the final broken line position 132, or the actuator 66 can be placed below the indicator 64 in which event the tabs 102 and 104 cooperate with the two fingers 96 and 98 to reverse the position of the indicator, viz, to move it from the position shown at 132 in FIG. 7 to the full line position.

In the suppositious situation given earlier where the coder is employed at an inspection station to permit carriers bearing workpieces which pass inspection to move on through the conveyor in a normal manner but cause carriers bearing workpieces which fail to pass inspection to be shunted off the main conveyor track and onto a side track for final disposition or further processing, it would be assumed in the form of the invention shown in FIG. 1 that the indicator 64 is in the switch operating position when the finger 98 is dependent, as shown at the extreme left in FIG. 7, but that the indicator is normally positioned with the finger 98 upright as shown in FIG. 1 when the carrier moves into the inspection station. In this connection, a fixed actuator having tabs similar to the ones on the actuator 66 but upstanding instead of depending, normally would be mounted below the indicator 68 somewhere in advance of the inspection station to assure that the indicator automatically is in the position shown in FIG. 1 as the carrier enters the station. Thus, if the indicator 68 is already positioned as shown in FIG. 1 as the carrier 28 moves past the fixed actuator it will do so without effect. However, if the indicator 68 is in the reverse position with the finger 98 dependent, the fixed actuator will move it automatically to the position shown in FIG. 1. It should be assumed further that a movable actuator 66 of the type shown in FIG. 1 is positioned at the far end of the inspection station and that it is normally disposed with the piston rod 116 retracted and the tabs 102 and 104 out of the path of travel of the indicator 68. Then if the inspector finds that the workpiece of a particular carrier 28 passes inspection, he simply permits the carrier to pass on through the station and it follows a normal course through the system. However, if the inspector finds that the workpiece is defective he pushes a manual switch which operates the power cylinder 118 in the manner herein above described to extend the piston rod 116 and thereby moves the tabs 102 and 104 into the path of travel of the indicator 68. When this happens, the indicator 68 engages the actuator 66 as the carrier 28 moves out of the station reversing the indicator so that the switch operating finger 98 is in the dependent switch-operating position. Thus, as the indicator 68 leaves the station, the dependent finger 98 operates a limit switch which in turn controls a track switch to position the latter to shunt the work carrier bearing the defective workpiece onto a side or storage track so that the carrier is removed from the normal flow through the conveyor system. In a situation of this kind, the shunted carrier 28 normally would trip a second limit switch as it moves onto the side track to reverse the track switch automatically to its normal position so that a following carrier operates in a normal manner to move along the main conveyor track or onto the side track depending on the particular coding of the carrier indicator.

While the above construction provides the coder with only one indicator means 68 it is possible within the concept of this invention to modify the coder to provide any reasonable number of indicators. This may be desirable in many conveyor systems; and, indeed, it may be essential if the conveyor system is complex and particularly if the work carriers are required to move through a number of different switch points or from one conveyor to another in the system.

FIG. 6 shows a modified indicator construction which is generally similar to that shown in FIG. 5 except that the pivot shaft 72 is considerably longer to accommodate a plurality of indicators 134, 136, 138, 140, 142 and 144. Each of the indicators 134 – 144 is identical to the indicator 68 shown in FIG. 5, they are identically mounted on the shaft 72, and they function in the same manner to achieve the same results as the indicator 68. Thus, each indicator 134 – 144 can be moved from one position to the other independently of the others and one or more of the indicators can be positioned with the switch operating arm 98 thereof in the raised position and one or more other of the indicators can be positioned with the switch operating arm 98 in the depending position. All of the switch operating arms 98 are shown in the upstanding position in FIG. 6 simply by way of illustration. Since each of the indicators 134 – 144 is disposed a different distance laterally of the work carrier on which it is mounted, each when in the switch operating position will operate any switch disposed in its path of travel. Thus, any one of the indicators 134 – 144 will pass by a switch without effect if it has been previously moved to the non-switch operating position or if the switch is not disposed for engagement by the switch operating finger of the indicator. Similarly, gang switches can be positioned selectively for engagement by certain ones of the indicators 134 – 144 so that a circuit controlled by the switches is completed only if all the switches are in selected predetermined positions. Thus, the number of possible switch operating combinations by a multiple indicator setup of the type shown is quite large. For example, 64 different switch operations can be coded into the six indicator arrangement of the type shown in FIG. 6.

If it is desired to operate the indicators of a multiple indicator setup of the type shown in FIG. 6 automatically, it is necessary to provide a separate actuator for each indicator; and the actuator construction and arrangement shown in FIG. 2 is not adaptable or suitable for this purpose. However, a multiple actuator arrangement of the type shown in FIGS. 8 and 9 is entirely satisfactory.

FIG. 9 shows two actuators 146 and 148 disposed side-by-side on a suitable mounting block 150 which is welded or otherwise affixed to a suitable support 151 such as one of the track hangers 62. While only two actuators 146 and 148 are here shown, it will be understood that any desired number of actuators can be provided side-by-side and the same number of actuators will normally be provided as there are indicators on the work carriers. For example, in the case of a six indicator setup of the type shown in FIG. 6, six actuators of the type shown in FIG. 9 would be used.

Each actuator in a gang setup of the type shown in FIG. 9 is identical to the others and a detail description of one therefore will suffice. In this connection, attention is directed to FIG. 8 which shows a single actuator of the type involved here and particularly the actuator 146 of FIG. 9. Each actuator comprises a pair of elongate main frame members 152 and 154 which are fastened on the mounting block 150 by a pair of longitudinally spaced bolts 156 and 158 and nuts 160 and 162 at the upper marginal edges thereof and are held apart by a spacer 164. Depending links 166, 168 and 170 are disposed between and fastened to the lower marginal edge portions of the body members 152 and 154 by longitudinally aligned pivots 172, 174 and 176, respectively; and all three links are interconnected by a longitudinal bar 178 which is attached thereto by longitudinally aligned pivots 180, 182, 184. As shown, the link 170 terminates at the bar 178 but the two links 166 and 168 extend below the bar 170, and the projecting terminal portions thereof carry tabs 186 and 188 which correspond to the tabs 102 and 104 in FIG. 1 and which perform the same function of operating or coding the indicator of a work carrier when the tabs are disposed in the path of travel of the indicator. A power cylinder 190 pivoted at 192 to the main frames 152 and 154 at substantially the middle thereof has a piston rod 194 which is pivoted at 196 to the link 170 substantially midway between the pivots 176 and 184. Air or hydraulic liquid under pressure is supplied to one end of the cylinder 190 through a pipe 198 and to the opposite end of the cylinder through a pipe 200. When fluid under pressure is supplied to the cylinder 190 through the pipe 200, the piston rod 194 is extended to move the links 166, 168 and 170 and their associated parts to the full line position shown in FIG. 8; and when fluid under pressure is supplied to the cylinder 190 through the pipe 198, the piston rod 194 is retracted to move the links 166, 168 and 170 and their associated parts to the broken line position. When the moving parts of the actuator are in the full line position, the tabs 186 and 188 are positioned to engage an indicator on a work carrier; and when the moving parts are in the broken line position, the tabs 186 and 188 are raised above the indicator so that the latter can pass under the actuator without effect.

Manifestly, only one actuator of the type shown in FIGS. 8 and 9 is used with one indicator and the actuator can be moved between operative positions in the same manner as the actuator 66 shown in FIG. 1. However, as suggested, the actuator construction shown in FIGS. 8 and 9 has the advantage that a plurality of actuators can be ganged together to operate a corresponding number of indicators which in turn are ganged together as shown in FIG. 6. When several actuators are arranged side-by-side as shown in FIG. 9, they preferably are suitably separated by spacers such as the one shown at 202 in FIG. 9; and the spacing in any particular instance is adapted to the spacing of the indicators on the work carriers so that each actuator is arranged above and properly aligned with a respective indicator. Thus, the various actuators in a gang setup can be individually operated between the full line and broken line positions shown in FIG. 8, to code a gang indicator setup selectively whereby to direct a particular work carrier to any desired location in the conveyor system in accordance with a prearranged or predetermined switching program.

From the foregoing, it will be readily apparent that the coder design of this invention requires minimum fabrication. This is assured by the simple design of the operating parts and particularly this is true of the indicator means on the work carriers. The counterweight effect of the indicators allows them to be tripped easily, quickly and positively and it assures that they will remain set in whatever position they are placed until ready for resetting. Setting or positioning the indicators for a particular signal is accomplished easily and expeditiously by selectively positioning the tabs or trippers of the actuators in the path of travel of the indicators. The particular construction of both the indicators and of the actuators permits any desired number of these devices to be ganged together in accordance with the requirements of the particular conveyor system; and the coder can be readily modified whenever desired by increasing or decreasing the number of indicators and actuators used in the assembly. Thus, full automatic operation of the work carriers is assured and the coding system can be easily modified whenever necessary to adapt it to any change of operating condition in the system.

We claim:

1. A coder for industrial conveyors of the type having a movable work carrier and a track on which the carrier travels, said coder comprising a horizontal pivot on and movable with said carrier,
indicator means having
 a switch operating member,
  said indicator means being mounted on said pivot for free pivotal movement and operative to swing said member in a vertical plane between switch-actuating and switch by-passing positions,
actuator means disposed beside said track and when said member is in one of said positions said actuator means being coactive with said indicator means as said work carrier moves along said track and carries said indicator means past said actuator means, whereby to actuate the latter automatically to swing said member to the other of said positions;
associated means coactive with said indicator means operative by pivotal movement of the latter to swing said switch operating member more than half way toward a selected switch-actuating or switch by-passing position to complete said movement independently of said actuator means and operative further to hold said switch operating member in said selected position; and
mounting means carrying said actuator means and operable to position the latter selectively into and out of the path of travel of said indicator means, said mounting means including
a power actuator which is operable to move said mounting means into and out of the path of travel of the switch operating member of said indicator means,
said mounting means being pivoted to a part of the track assembly for movement transversely to said track, and
said mounting means being physically attached to said actuator means and engageable with said track to position said actuator means in the path of travel of said indicator means.

2. A coder for industrial systems including
indicator means adapted to be mounted for limited pivotal movement in two directions and having
a plurality of right angularly spaced, radially extending actuator members,
 one of said actuator members being counterweighted and operative to assist other of said actuator members in moving said indicator means in said two directions and further operative to hold said indicator means normally at the limit of its pivotal movement in either direction.

3. The combination as set forth in claim 2, wherein said indicator means has a first and a second actuator member in addition to said counterweighted actuator member.

4. The combination as set forth in claim 3, wherein said first actuator member extends oppositely to said counterweighted member and
wherein said second actuator member extends substantially at right angles to said first actuator member and to said counterweighted actuator member.

\* \* \* \* \*